UNITED STATES PATENT OFFICE.

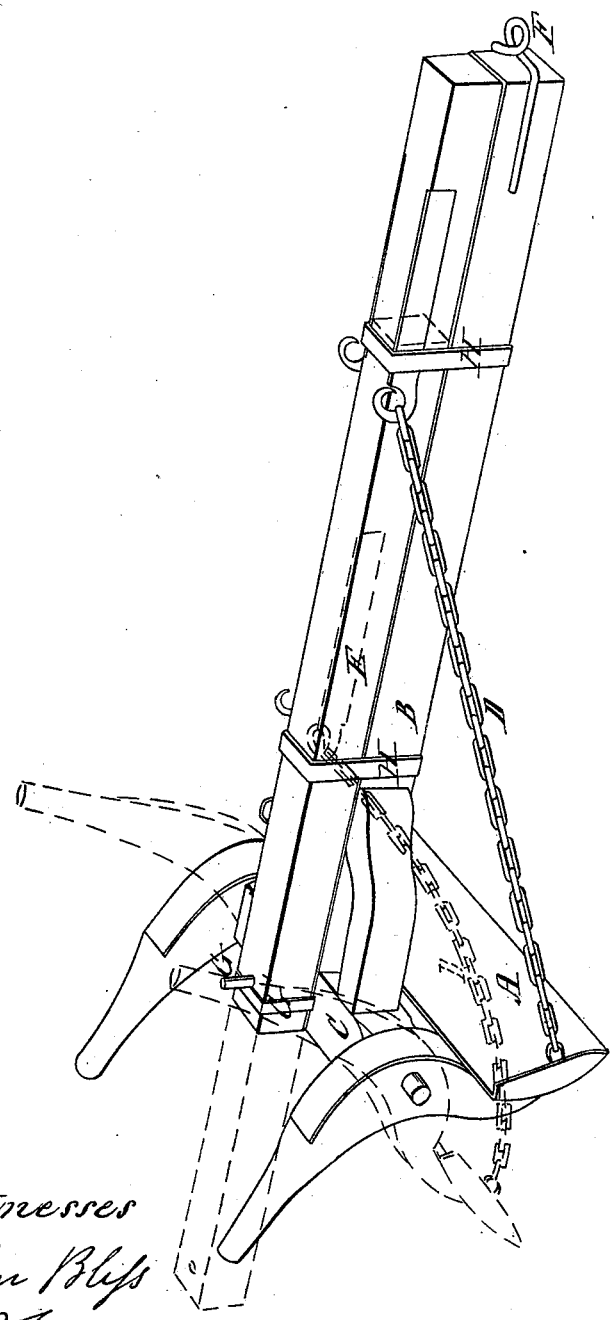

JOHN GUSTINE AND J. M. RANKIN, OF LEWISTOWN, ILLINOIS.

ROAD-SCRAPER.

Specification of Letters Patent No. 14,809, dated May 6, 1856.

*To all whom it may concern:*

Be it known that we, JOHN GUSTINE and J. M. RANKIN, of Lewistown, in the county of Fulton and State of Illinois, have invented a new and useful Improvement in the Mode of Constructing Road-Scrapers, of which the following description, illustrated by the accompanying drawing and references, is sufficiently clear and distinct to enable others of competent skill to make and use our invention.

The nature of our invention relates to a mode of constructing the beam and its attachments making it in two parts—and the connections for holding and operating the scraper, so that it may be easily and readily unloaded and yet possess the desirable quality of having a stationary support to operate as a brace while the load is being received.

The drawing is a perspective view of the entire scraper. The red lines represent the position of the scraper edge or place when the load is being delivered or unloaded of its contents.

The part of the scraper A is nearly of the usual construction and is attached to a stationary beam or tongue B, by the axle C the lower or cutting edge is held by side chains D, attached to hooks fixed upon the sides of a second or slide beam E, as represented.

The team being connected in the usual manner to the staple F, the scraper is brought to its operating position and the pin G inserted as shown in the drawing in the slide beam immediately in front of the beam G'. Upon the scraper being loaded and drawn to the proper place for being discharged, the pin is withdrawn by the driver or tender, and the upper beam slides through the bands H, H, thus loosening the chains and allowing the scraper to turn partially over as represented by the red lines and is thus discharged of its load. It is then again in this condition conducted to the place for reloading it. And by a pressure, or kick of the foot, or by being brought to its place by hand, which will be easily done as it will in this condition be discharged of its load and consequently very light, it is again in order and after being brought back to its original operating condition the pin G is again inserted. An important object thus gained in the use of this scraper is the employment of a tongue as a brace, so as to render it unnecessary for the operator to follow the scraper partially bent in form, and hold it by a strong effort, while it is being filled or laden, and yet to afford a convenient mode of discharging and replacing it for another load.

What we claim as our invention and desire secured to us by Letters Patent is—

The beam E sliding through bands H, H, upon the tongue B attached by the chains D to the scraper and operated and made fast by withdrawing or inserting the pin G or its equivalent the whole constructed in the manner and for the purposes substantially set forth.

JOHN GUSTINE.
J. M. RANKIN

Witnesses:
JOHN BLISS,
H. B. EVANS.